United States Patent
Tkacik et al.

(10) Patent No.: US 7,512,723 B2
(45) Date of Patent: Mar. 31, 2009

(54) QUEUED INTERFACE DEVICES, MULTI-CORE PERIPHERAL SYSTEMS, AND METHODS FOR SHARING A PERIPHERAL IN A MULTI-CORE SYSTEM

(75) Inventors: Thomas E. Tkacik, Phoenix, AZ (US); Matthew W. Brocker, Chandler, AZ (US); Lawrence L. Case, Phoenix, AZ (US); Erik D. Swanson, Mesa, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 215 days.

(21) Appl. No.: 11/647,653

(22) Filed: Dec. 29, 2006

(65) Prior Publication Data
US 2008/0162745 A1 Jul. 3, 2008

(51) Int. Cl.
*G06F 3/00* (2006.01)
(52) U.S. Cl. .................. 710/33; 710/309; 710/113; 710/120
(58) Field of Classification Search ......... 710/240–244, 710/38–40, 306–316, 107–110
See application file for complete search history.

(56) References Cited
U.S. PATENT DOCUMENTS

| | | | | |
|---|---|---|---|---|
| 4,237,534 A | * | 12/1980 | Felix | ................. 710/123 |
| 5,530,933 A | * | 6/1996 | Frink et al. | ................. 711/141 |
| 6,078,983 A | * | 6/2000 | Hanawa et al. | .............. 710/240 |
| 6,249,846 B1 | * | 6/2001 | Van Doren et al. | .......... 711/144 |
| 6,584,529 B1 | * | 6/2003 | Thomas | .................. 710/240 |
| 6,662,253 B1 | | 12/2003 | Gary et al. | |
| 6,931,470 B2 | | 8/2005 | Ballantyne et al. | |
| 6,944,686 B2 | * | 9/2005 | Naruse et al. | .................. 710/39 |
| 7,062,582 B1 | * | 6/2006 | Chowdhuri | ................. 710/116 |
| 7,383,336 B2 | * | 6/2008 | Strait et al. | ................. 709/226 |
| 2004/0019749 A1 | * | 1/2004 | Mochida et al. | ............. 711/151 |
| 2005/0080967 A1 | | 4/2005 | Ries et al. | |

* cited by examiner

*Primary Examiner*—Raymond N Phan
(74) *Attorney, Agent, or Firm*—Ingrassia, Fisher & Lorenz, P.C.

(57) ABSTRACT

A queued interface device configured to communicate with a peripheral includes a first interface configured to receive and store a first set of peripheral requests from a first core, a second interface configured to receive and store a second set of peripheral requests from a second core, and an arbitrator coupled to the first interface and the second interface. The arbitrator, which may include multiple sets of registers to store the peripheral requests, is configured to selectively send the first set of peripheral requests and the second set of peripheral requests to the peripheral. The peripheral simultaneously appears as a dedicated peripheral for both the first and second cores.

22 Claims, 3 Drawing Sheets

QUEUED INTERFACE DEVICES, MULTI-CORE PERIPHERAL SYSTEMS, AND METHODS FOR SHARING A PERIPHERAL IN A MULTI-CORE SYSTEM

TECHNICAL FIELD

The present invention relates generally to multi-core systems and, more particularly, to the use of peripherals in conjunction with multi-core systems.

BACKGROUND

In multi-core systems, it is often desirable for the individual cores (e.g., microprocessors, digital signal processors (DSPs), and the like) to share a peripheral device, rather than being coupled to their own dedicated devices. That is, while it is common in prior art systems to include two peripheral devices, where each is coupled to a corresponding core, such configurations may be replaced by a system as shown in the block diagram of FIG. 1. As illustrated, a prior art dual-core system might include two cores 102 and 104 sharing a peripheral 120 through bus arbiter 110 and shared peripheral bus 112, which might include any number of such peripherals.

The illustrated architecture is unsatisfactory in a number of respects. For example, the software driver and hardware support required outside of the peripheral becomes increasingly more complicated as cores are added, as each core typically includes its own copy of the driver, and each driver requires knowledge of all other cores within the system. This can cause a security risk, as one core may stop the other core from accessing the peripheral, resulting in a "denial of service" attack. Furthermore, typical peripherals are capable of generating only a single interrupt. This single interrupt is then either multiplexed between the two interrupt control handlers (associated with each core) or sent to both handlers. Furthermore, in the illustrated architecture, one of the cores may cause the peripheral to enter an error state, which will then prevent the second core from accessing that peripheral.

Accordingly, it is desirable to provide systems and methods for simplifying the sharing of peripherals between cores in multi-core systems. Other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of various embodiments may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the scope or application of possible embodiments. Furthermore, there is no intention to be bound by any expressed or implied theory presented in the preceding technical field, background, brief summary or the following detailed description.

Various embodiments may be described herein in terms of functional and/or logical block components and various processing steps. It should be appreciated that such block components may be realized by any number of hardware, software, and/or firmware components configured to perform the specified functions. For the sake of brevity, conventional techniques related to processors, peripherals, and associated signaling are not described herein.

Figure 1:
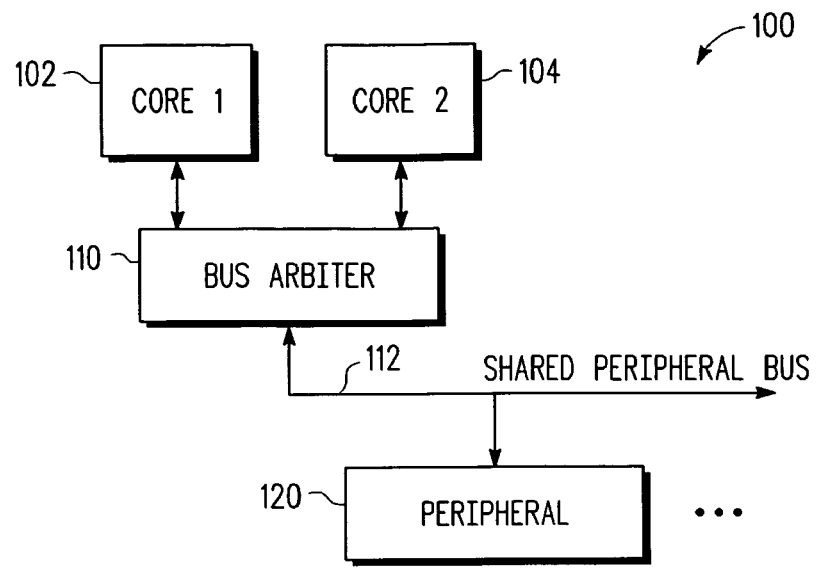
FIG. 1 is a block diagram of a typical prior art system for sharing peripherals between cores.
Figure 2:
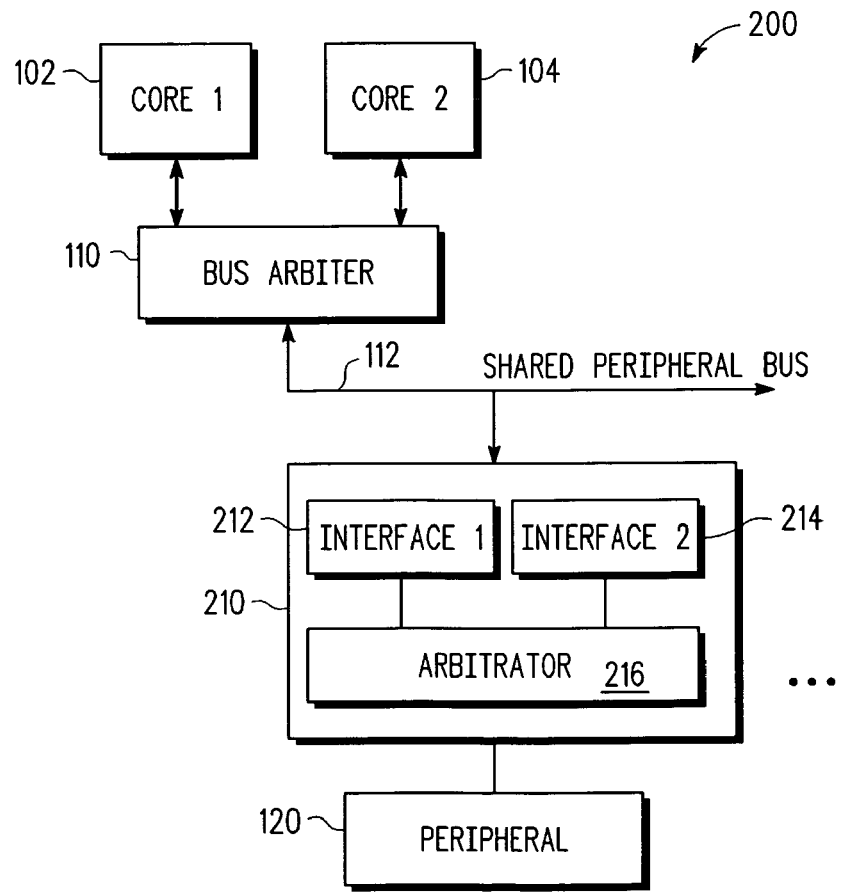
FIG. 2 is a block diagram depicting a queued interface device in accordance with one embodiment.

With reference to FIG. 2, a multi-core peripheral system in accordance with one embodiment generally includes a first core 102, a second core 104, a bus arbiter 110, a shared peripheral bus 112, one or more queued interface devices 210, and one or more associated peripherals 120. Queued interface device (or simply "interface device" or "device") 210 includes two interfaces: interface 1 (212) and interface 2 (214), wherein interfaces 212 and 214 are suitably associated with respective cores 102 and 104. Interface device 210 also includes an arbitrator 216 coupled to interfaces 212 and 214, which controls data flow to and from peripheral 120, as described in greater detail below.

In this regard, the term "core" as used herein refers to any combination of hardware, software, and firmware typically configured to make requests and/or receive status information from associated circuitry and/or modules (e.g., one or more peripherals, as described below). Such cores include, for example, digital signal processors (DSPs), central processing units (CPUs), microprocessors, and the like. These cores are often also referred to as "masters," in that they often act as a bus master with respect to any associated peripherals.

Furthermore, the term "Multi-core" (or "multi-master") thus refers to any combination of hardware, software, and firmware that that includes two or more such cores (e.g., cores 102 and 104), regardless of whether the individual cores are fabricated monolithically (i.e., on the same chip) or separately. While the term "dual-core" refers to a system with two cores, any uses of the phrase "dual master" or "dual-core" are not intended limitations on the number of cores and masters that can be used in various embodiments. It will be understood that the second core 104 may be the same physical core as first core 102, but has multiple modes of operation (i.e., core 104 is "virtualized").

With respect to peripherals 120, the term "peripheral" as used herein refers to any combination of hardware and associated software that receives requests (e.g., from one or more cores) and produces an output (e.g., error codes, state information, and the like) that is read by that core. The peripheral may be implemented on the same chip as one or more of the cores, or may be external thereto. Example peripherals include encryption engines, network packet processing modules, floating point operators, graphics engines, MPEG encoders/decoders, codecs, and the like. Such peripherals are typically employed to expand the capabilities of the system, and may also be referred to as "resources."

Figure 3:
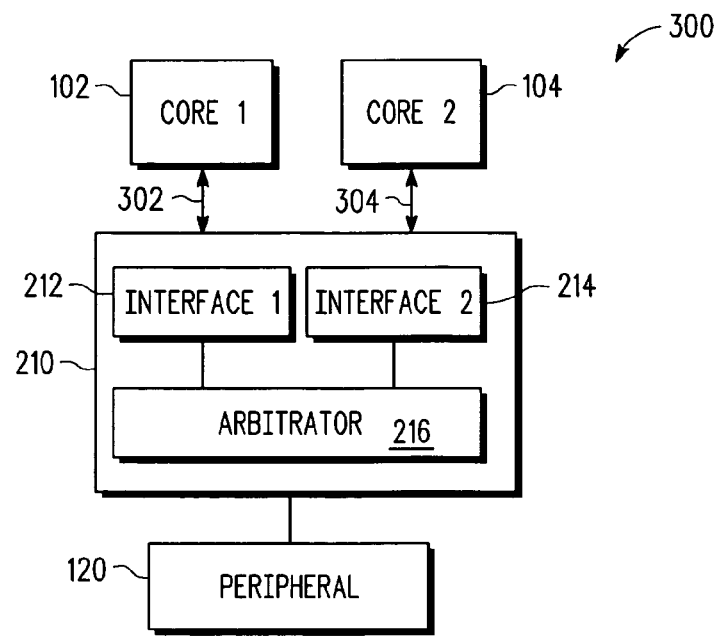
FIG. 3 is a block diagram depicting a queued interface device in accordance with an alternate embodiment.

Bus arbiter 110 acts to control the cores' access to shared peripheral bus 112. Such bus arbiters and peripheral buses are well known in the art, and need not be discussed in detail herein. In this regard, while FIG. 2 depicts an embodiment that includes two cores communicating with a peripheral 120 via a bus arbiter 110 attached to a shared peripheral bus 112, a variety of other embodiments and configurations are also possible. For example, FIG. 3 shows an alternate embodiment that does not include a bus arbiter and shared interface bus, but instead includes direct bus connections 302 and 304 leading from cores 102 and 104 (and hence interfaces 212 and 214), respectively.

Regardless of the particular implementation, each of the interfaces 212 and 214 are configured to receive and store peripheral requests from cores 102 and 104, respectively. The form and content of these requests will vary, depending upon the particular peripheral and protocols being used, but are well known in the art. Arbitrator 216, which is coupled to interfaces 212 and 214, is configured to selectively send the first set of peripherals requests (stored in interface 212) and the second set of peripheral requests (stored in interface 214) to peripheral 120, using any suitable arbitration scheme. Similarly, arbitrator 216 is configured to receive any responses (data, error codes, status information, etc.) from peripheral 120 and store those responses in the appropriate interface for access by the respective core. In this way, since the arbitration of peripheral requests is invisible to the cores, each core perceives that it has its own dedicated peripheral 120.

Figure 4:
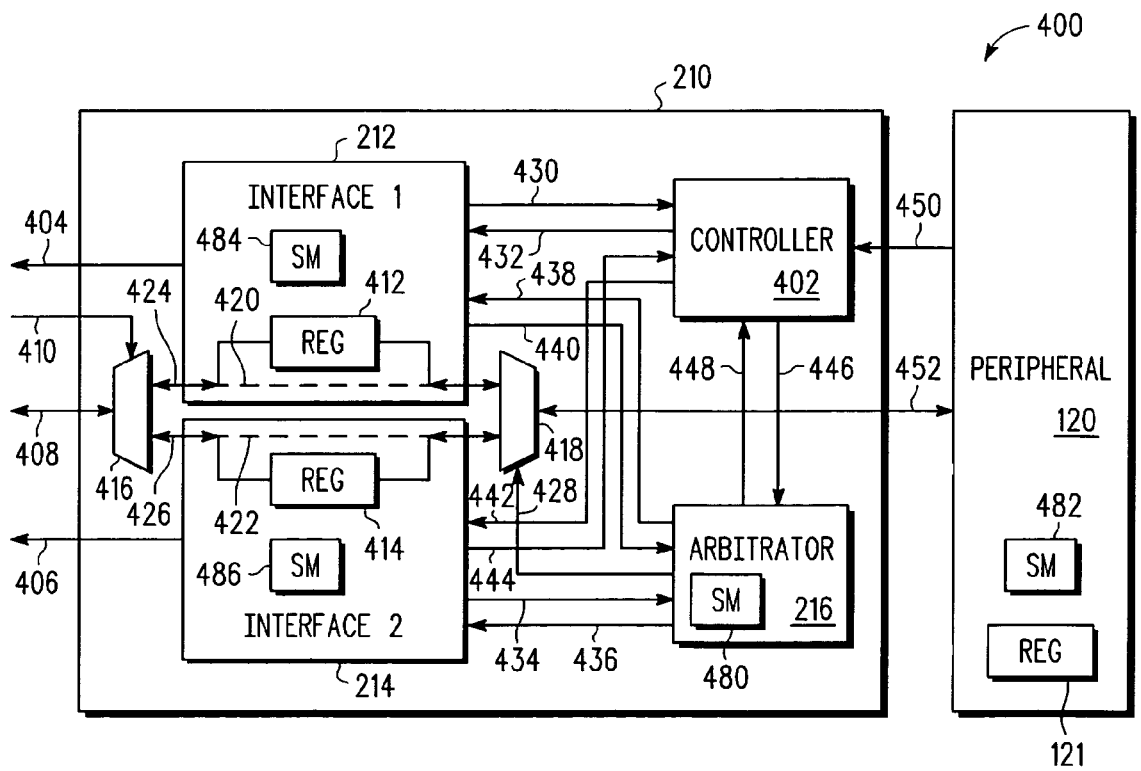
FIG. 4 is a detailed block diagram of an exemplary queued interface device.

FIG. 4 shows a more detailed block diagram 400 of an example queued interface device 210 coupled to peripheral 120. As shown, queued interface device 210 includes interface 212, interface 214, arbitrator 216, a controller 402, and multiplexers 416 and 418. In an alternate embodiment such as that shown in FIG. 3, multiplexer 416 is not included. Each interface 212 and 214 includes respective memory registers (or simply "registers") 412 and 414. These registers might include, for example, information related to a peripheral's busy state, error state, operation completion state, and the like. They would also typically include configuration, control, and/or command registers. The queued interface device 210 will read information from the peripheral and store the information in registers 412 or 414. In general, after reading the information, the queued interface device 210 resets the peripheral to an idle state so that the peripheral can begin another operation—for example, a second core's queued request.

The structure of registers 412 and 414 may be the same as that of registers 121. That is, to the extent that it is desirable for the access and control of registers 121 to be transparent to any external systems, registers 121, 412, and 414 may have the same number of registers, the same address definitions for each register, the same organization of registers, and/or the same internal bit definitions for each register. Various state machines are implemented throughout device 400, including state machine 482 associated with peripheral 120, state machine 480 associated with arbitrator 216, and state machines 484, 486 associated with interfaces 212, 214 respectively. The operation of these state machines are described in further detail below. Those skilled in the art will recognize that the block diagram of FIG. 4 is conceptual, and that various additional components may be present in specific embodiments.

Peripheral requests are received via bus input (or "line") 408, the flow of which (to registers 412 and 414, lines 424 and 426, and bypasses 420 and 422) is controlled via multiplexer 416, using a suitable selection signal 410 (e.g., a selection signal based on a core ID associated with each core, or other suitable signal). The core ID is an independent value that is statically assigned to each core, and which is passed along the bus with other transaction information to uniquely identify which core is making the request. The core ID may be a single bit, in the case of a dual core system, or multiple bits. In a system with three or more cores, and a peripheral with two interface blocks, the core ID can be used to restrict access to the peripheral to the selected two cores. The flow of peripheral requests (stored in registers 412 and 414) is controlled via multiplexer 418, using a suitable selection signal 428 from arbitrator 216. In this way, requests are sent via signal 452 to peripheral 120.

Responses or other signals 450 from peripheral 120 are received by controller 402. Peripheral 120 generally includes its own register 121, which includes a list of requests and responses associated with the peripheral. Controller 402 communicates with arbitrator 216 via signals 448 ("start" indicator) and 446 ("done" indicator). Controller 402 communicates with interface 212 via state signals 430 and 432, and similarly communicates with interface 214 through state signals 442 and 444. Arbitrator 216 communicates with interface 212 via signals 438 and 440, and also communicates with interface 214 via signals 434 and 436. These signals may include, for example, "multiplexer enable", "done,""pending," "busy," or the like.

In general, controller 402 and arbitrator 216 together control the flow of the requests stored in registers 412 and 414 to and from peripheral 120. For example, if it is determined (based on a suitable arbitration scheme) that requests from core 102 should be processed, the requests stored within registers 412 are transferred to registers 121 of peripheral 120 (via multiplexer 418 and line 452), whereupon peripheral 120 acts on these requests and produces some form of response, which is also stored in registers 121. Subsequently, the contents of register 121 is transferred to registers 412, and ultimately to the corresponding core (via multiplexer 416 and line 408). In addition, interrupts 404 and 406 from respective interfaces 212 and 214 are provided to the corresponding cores (102 and 104) in any suitable manner, including being sent directly to the corresponding core (specific connections not shown in FIGS. 2 and 3).

In an alternate embodiment, peripheral 120 does not include its own register 121, but instead includes a multiplexer circuit, or the like, configured to selectively access registers 412 and 414 directly. That is, rather than copying the mirrored registers (412 or 414) to register 121 prior to starting a task, 412 or 414 is selected by the peripheral and treated as though it were its own internal register.

Figure 5:
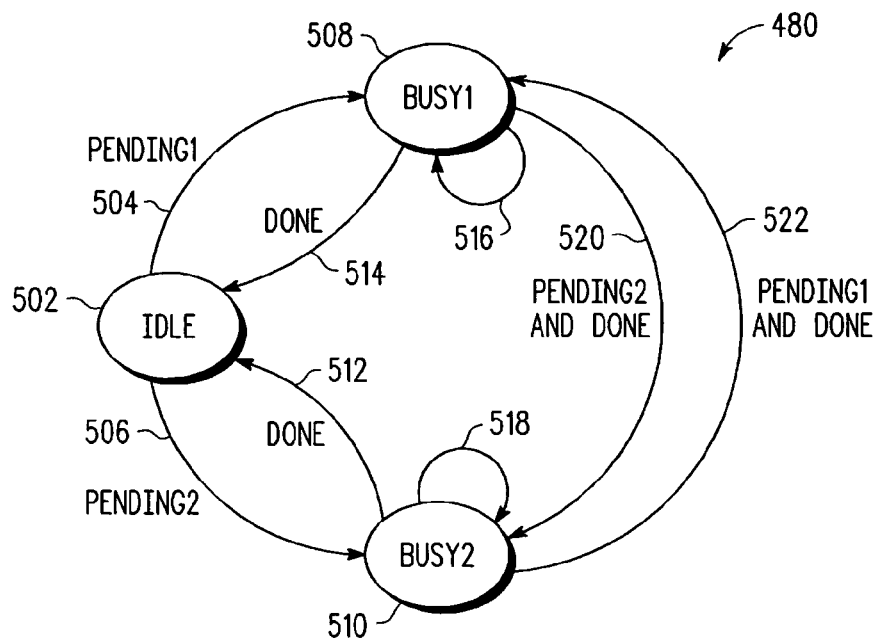
FIG. 5 is a state diagram of an exemplary arbitration scheme in accordance with one embodiment.

FIG. 5 shows a simplified state diagram 480 depicting operation of an arbitration scheme used in a queued interface device in accordance with the illustrated embodiments. The terms "state machine" and "state diagram" may be used interchangeably. The illustrated state diagram may be implemented in any convenient manner. In the illustrated embodiment, as depicted in FIG. 4, the state diagram of FIG. 5 is implemented as hardware, software and/or firmware within Arbitrator 216, and takes as its input various signals from Controller 402. As shown in FIG. 5, the queued interface device 210 has three states: "Idle" state 502, "Busy1" state 508, and "Busy2" state 510, as well as corresponding "edges" 504, 506, 514, 512, 520, 522, 516, 518. The "Idle" state corresponds to a wait or inactive state, where all transactions have been completed and cleared as is known in the art. The "Busy1" state corresponds to a state where the system is busy processing requests from one core (e.g., core 102), and the "Busy2" state corresponds to a state where the system is busy processing requests from a second core (e.g., core 104).

State machine 480 initially starts in Idle state 502. If core 102 sends a request to interface 212, then state machine 480 will transition along edge 504 to Busy1 state 508. At that time, the contents of registers 412 are copied to registers 121. The arbitrator state machine 480 will then remain in Busy1 state 508 until peripheral 120 indicates that it has completed the request. If core 104 has not also sent a request to interface 214, then state machine 480 will transition back to Idle state 502 along edge 514. When this occurs, registers 121 will be copied back to registers 412.

Likewise, if core 104 sends a request to the interface 214 while it is idle, the arbitrator state machine 480 will transition along edge 506 to Busy2 state 510, and the contents of registers 414 will be copied to registers 121. When peripheral 120 has indicated that it has completed the request, state machine 480 will transition along edge 512 back to Idle state 502, and the contents of registers 121 will be copied to registers 414.

If the arbitrator state machine 480 is in Busy1 state 508, thus processing a request for core 102, and core 104 then sends a request to interface 214, the arbitrator state machine 480 will remain in Busy1 state 508 until peripheral 120 indicates that is has completed the request for core 102. The state machine 480 will then transition along edge 520 to Busy2 state 510. The contents of registers 121 are copied to registers 412, the contents of registers 414 are copied to registers 121, and the peripheral 120 begins processing the request for core 104.

If the state machine 480 is in Busy2 state 510, thus processing a request for core 104, and core 102 then sends a request to the interface 212, the state machine 480 will remain in Busy2 state 510 state until the peripheral 120 indicates that is has completed the request for core 104. The state machine 480 will then transition along edge 522 to Busy1 state 508. The contents of registers 121 are copied to registers 414, the contents of registers 412 are copied to registers 121, and peripheral 120 begins processing the request for core 102.

Figure 6:
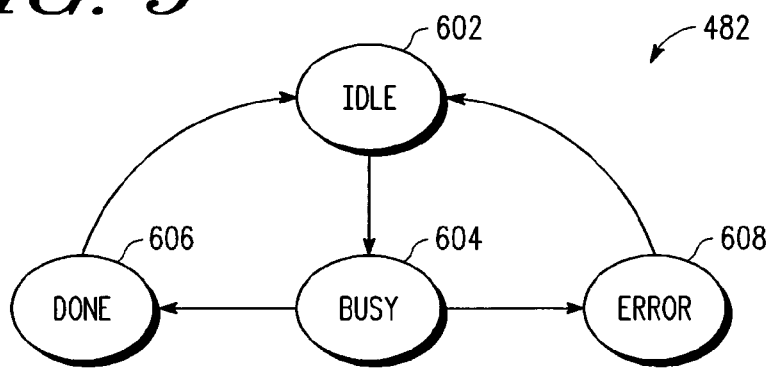
FIG. 6 is a state diagram representing the high-level state of the peripheral of FIG. 4.

FIG. 6 shows a simplified state diagram 482 depicting the internal high level state of peripheral 120. As illustrated, there are four states: Idle (602), Busy (604), Done (606) and Error (608). Initially, peripheral 120 is in Idle state 602 waiting for a request. When the request arrives, peripheral state machine 482 transitions to Busy state 604. When peripheral 120 has completed the request, state machine 482 transitions to Done 606 state (if the request was completed properly), or to Error state 608 (if the request was completed improperly). Peripheral 120 asserts a done interrupt or an error interrupt using signal 450 in FIG. 4. When the interrupt is acknowledged (by reading a status register within registers 121, or by writing a "clear interrupt" command to a command register within registers 121), the state machine transitions back to Idle state 602. There are other ways of clearing the interrupt and transitioning from Done state 606 (or Error state 608). For example, the interrupt may comprise a single clock cycle pulse, and the transition back to Idle state 602 may occur automatically. The controller 402 then captures the Done interrupt signal. It will be appreciated that the illustrated state machine is merely exemplary; a variety of other implementations would also be suitable.

Figure 7:
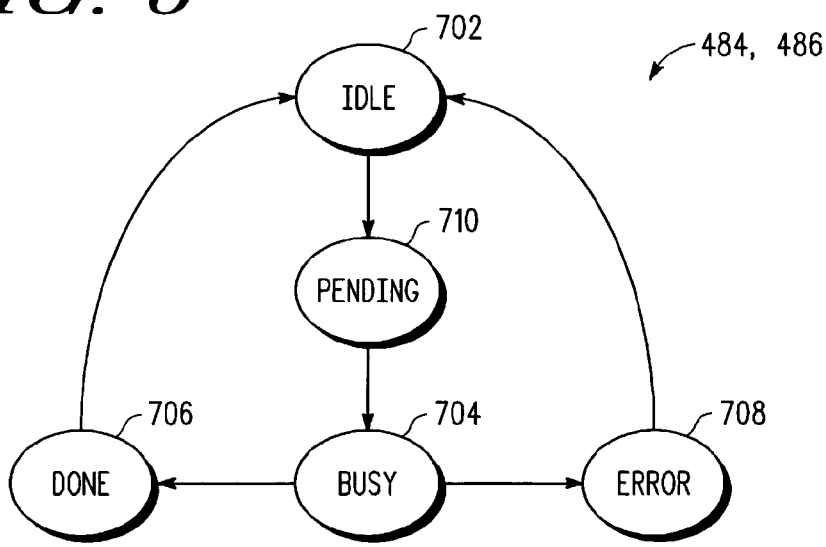
FIG. 7 is a state diagram representing a view of the peripheral's internal state from the point of view of the queued interface device.

FIG. 7 illustrates the operation of state machines 484 and 486 within interfaces 212 and 214, respectively, and more particularly depicts the state of peripheral 120 as viewed by core 102 or 104 monitoring interface 212 or 214. State machines 484 and 486 are generally equivalent to state machine 482 of peripheral 120, but each includes an extra state: Pending state 710. Pending state 710 corresponds to the case where peripheral 120 is busy processing a request for another core. When an interface is in Pending state 710, a core will read the status information in registers 412 or 414 indicating that peripheral 120 is in a busy state.

Without loss of generality, the following discussion will reference state machine 484, with the assumption that state machine 486 operates in an equivalent manner. As shown, state machine 484 transitions from Idle state 702 to Pending state 710 only when the core 102 sends it a request. A request from the other core (e.g., 104) to the other interface (i.e., 214) will not cause the interface state machine to move from Idle 702 to Pending 710. If peripheral 120 is idle when core 102 gives a request to interface 212, then the state machine will move through Pending state 710 to Busy state 704. The contents of registers 412 are then copied to registers 121, causing peripheral 120 to start processing the request for core 102. When the peripheral indicates that it has completed the request (via controller 402 and arbitrator 216), state machine 484 will transition to either Done state 706 or Error state 708, and the contents of registers 121 will be copied to registers 412.

If peripheral 120 is busy processing a request for core 104 via interface 214, when core 102 sends a request to interface 212, state machine 484 for interface 212 will transition to the Pending 710 state. It will remain there until the peripheral 120 indicates that is has completed the request for core 104 (via controller 402 and arbitrator 216). Controller 402 will cause registers 121 to be copied to registers 414, and then cause registers 412 to be copied to registers 121. Interface 212 state machine 484 will then move from Pending state 710 to Busy state 704, while state machine 486 will move from Busy state 704 to either Done state 706 or Error state 708.

The state of state machine 484 is reflected in its status register within registers 412. In one embodiment, both the Pending state 710 and Busy state 704 are represented by the same value, so that core 102 does not know when the peripheral is processing a request for core 104. That is, at that point, core 102 only knows that the peripheral 120 is busy processing its request. Thus, in accordance with operation of the various state machines 484, 486, 480, and 482, the peripheral simultaneously appears as a dedicated peripheral for both the first and second cores 102 and 104.

In summary, what has been presented is a queued interface device and related methods that allow multiple cores to share a common peripheral in a way that gives each core the impression that it actually has a dedicated peripheral, and does not require communication or coordination between the various cores.

In one embodiment, a queued interface device is configured to communicate with a peripheral, and comprises: a first interface configured to receive and store a first set of peripheral requests from a first core; a second interface configured to receive and store a second set of peripheral requests from a second core; and an arbitrator coupled to the first interface and the second interface, the arbitrator configured to: send the first set of peripheral requests to the peripheral and receive a first set of peripheral responses associated therewith; send the second set of peripheral requests to the peripheral and receive a second set of peripheral responses associated therewith; and selectively send the first set of peripheral results to the first core and the second set of peripheral results to the second core. In a particular embodiment, the peripheral simultaneously appears as a dedicated peripheral for both the first and second cores.

In one embodiment, the first interface includes a first set of registers configured to store the first set of peripheral requests, and the second interface includes a second set of registers configured to store the second set of peripheral requests. The first and second sets of memory registers may have the same structure as a third set of memory registers within the peripheral.

One embodiment further includes a multiplexer coupled to the arbitrator, the first set of memory registers, and the second set of memory registers, the multiplexer configured to allow selective transmission of the first and second set of peripheral requests to the peripheral in response to a signal from the arbitrator. In another embodiment, the first core has an associated first core ID, the second core has an associated second core ID, and the selective transmission by the multiplexer is based on receipt of one of the first core ID or the second core ID.

Another embodiment further includes a controller coupled to the arbitrator, the first interface, and the second interface, wherein the controller is configured to instruct the arbitrator to send the first set of peripheral results to the first core and the second set of peripheral results to the second core. The controller may be configured to enter a first busy state when the peripheral is processing the first set of peripheral requests, and is configured to enter a second busy state when the peripheral is processing the second set of peripheral requests.

A multi-core peripheral system in accordance with one embodiment includes a first core; a second core; a peripheral; and a queued interface device configured to communicate with the peripheral, the queued interface device comprising a first interface configured to receive and store a first set of peripheral requests from the first core, a second interface configured to receive and store a second set of peripheral requests from the second core, and an arbitrator coupled to the first interface and the second interface, the arbitrator configured to selectively send the first set of peripheral requests and the second set of peripheral requests to the peripheral and to receive respective first set of peripheral results and second set of peripheral results. The first and second set of peripheral results are consistent with the peripheral simultaneously being a dedicated peripheral for both the first and second cores. In one embodiment, the first core includes a subsystem selected from the group consisting of a digital signal processor and a central processing unit, and the peripheral includes a subsystem selected from the group consisting of a floating point calculation subsystem, an encryption/decryption engine, a graphics engine, an image processing engine, or a video processing engine.

The system may further include a shared peripheral bus coupled to the queued interface device; and a bus arbiter coupled to the shared peripheral bus and the first and second cores, the bus arbiter configured to selectively allow requests from the first and second cores to be communicated over the shared peripheral bus.

In one embodiment, the queued interface device is configured to enter a first busy state when the peripheral is processing the first set of peripheral requests, and is configured to enter a second busy state when the peripheral is processing the second set of peripheral requests. In various embodiments, the first core has an associated first core ID, the second core has an associated second core ID, and the arbitrator is configured to selectively send the first set of peripheral requests and the second set of peripheral requests to the peripheral based on receipt of one of the first core ID or the second core ID. In one embodiment, the first interface includes a first state machine, the second interface includes a second state machine, and the peripheral includes a third state machine, wherein each of the first and second state machines have the same topology as the third state machine, but further comprise a respective pending state.

A method of sharing a peripheral in a multi-core system includes: receiving a first set of peripheral requests from a first core; receiving a second set of peripheral requests from a second core; and selectively sending the first set of peripheral requests and the second set of peripheral requests to the peripheral; receiving a first set of peripheral responses from the peripheral; receiving a second set of peripheral responses from the peripheral; sending the first set of peripheral responses to the first core and the second set of peripheral responses to the second core. During the sending step, the peripheral simultaneously appears to be a dedicated peripheral for both the first and second cores. The method may include entering a first busy state when the peripheral is processing the first set of peripheral requests, and entering a second busy state when the peripheral is processing the second set of peripheral requests. In one embodiment, the method includes receiving the first set of peripheral requests and the second set of peripheral requests via a shared peripheral bus. In another, the method includes receiving the first set of peripheral requests via a first dedicated bus, and receiving the second set of peripheral requests via a second dedicated bus.

While at least one example embodiment has been presented in the foregoing detailed description, it should be appreciated that a vast number of variations exist. It should also be appreciated that the example embodiment or embodiments described herein are not intended to limit the scope, applicability, or configuration of the embodiments in any way. Rather, the foregoing detailed description will provide those skilled in the art with a convenient road map for implementing the described embodiment or embodiments. It should be understood that various changes can be made in the function and arrangement of elements without departing from the scope set forth in the appended claims and the legal equivalents thereof.

What is claimed is:

1. A queued interface device configured to communicate with a peripheral, the queued interface device comprising:
   a first interface configured to receive and store a first set of peripheral requests from a first core, and to enter a busy state of a first state machine in response to receiving the first set of peripheral requests;
   a second interface configured to receive and store a second set of peripheral requests from a second core, and to enter a pending state of a second state machine in response to receiving the second set of peripheral requests if the peripheral is busy processing the first set of peripheral requests from the first core, and when the peripheral has completed processing the first set of peripheral requests from the first core, the second interface is further configured to enter a busy state of the second state machine during which the peripheral processes the second set of peripheral requests from the second core; and
   an arbitrator coupled to the first interface and the second interface, the arbitrator configured to: send the first set of peripheral requests to the peripheral and receive a first set of peripheral responses associated therewith; send the second set of peripheral requests to the peripheral and receive a second set of peripheral responses associated therewith; and selectively send the first set of peripheral results to the first core and the second set of peripheral results to the second core.

2. The device of claim 1, wherein the peripheral simultaneously appears as a dedicated peripheral for both the first and second cores.

3. The device of claim 1, wherein the first interface includes a first set of registers configured to store the first set of peripheral requests, and the second interface includes a second set of registers configured to store the second set of peripheral requests.

4. The device of claim 1, further including a controller coupled to the arbitrator, the first interface, and the second interface, wherein the controller is configured to instruct the arbitrator to send the first set of peripheral results to the first core and the second set of peripheral results to the second core.

5. The device of claim 1, wherein the second interface is further configured to represent the busy state of the second state machine and the pending state of the second state machine in a status register of the second interface, and wherein the busy state and the pending state are represented by a same value.

6. The device of claim 1, wherein the first interface is further configured to enter a pending state of the first state machine when the first interface receives a third set of peripheral requests from the first core while the peripheral is busy processing the second set of peripheral requests from the second core, and when the peripheral has completed processing the second set of peripheral requests from the second core, the first interface is further configured to enter the busy state of the first state machine during which the peripheral processes the third set of peripheral requests from the first core.

7. The device of claim 3, further including a multiplexer coupled to the arbitrator, the first set of memory registers, and the second set of memory registers, the multiplexer configured to allow selective transmission of the first and second set of peripheral requests to the peripheral in response to a signal from the arbitrator.

8. The device of claim 7, wherein the first core has an associated first core ID, the second core has an associated second core ID, and the selective transmission by the multiplexer is based on receipt of one of the first core ID or the second core ID.

9. The device of claim 4, wherein the controller is configured to enter a first busy state of a third state machine when the peripheral is processing the first set of peripheral requests, and is configured to enter a second busy state of the third state machine when the peripheral is processing the second set of peripheral requests.

10. A queued interface device configured to communicate with a peripheral, the queued interface device comprising:
a first interface configured to receive and store a first set of peripheral requests from a first core;
a second interface configured to receive and store a second set of peripheral requests from a second core; and
an arbitrator coupled to the first interface and the second interface, the arbitrator configured to: send the first set of peripheral requests to the peripheral and receive a first set of peripheral responses associated therewith; send the second set of peripheral requests to the peripheral and receive a second set of peripheral responses associated therewith; and selectively send the first set of peripheral results to the first core and the second set of peripheral results to the second core,
wherein the first interface includes a first set of memory registers configured to store the first set of peripheral requests, and the second interface includes a second set of memory registers configured to store the second set of peripheral requests, and
wherein the first and second sets of memory registers have the same structure as a third set of memory registers within the peripheral.

11. A multi-core peripheral system comprising:
a first core;
a second core;
a peripheral; and
a queued interface device configured to communicate with the peripheral, the queued interface device comprising a first interface configured to receive and store a first set of peripheral requests from the first core, a second interface configured to receive and store a second set of peripheral requests from the second core, and an arbitrator coupled to the first interface and the second interface, the arbitrator configured to selectively send the first set of peripheral requests and the second set of peripheral requests to the peripheral and to receive respective first set of peripheral results and second set of peripheral results,
wherein the first interface is further configured to enter a busy state of a first state machine in response to receiving the first set of peripheral requests, and the second interface is further configured to enter a pending state of a second state machine in response to receiving the second set of peripheral requests if the peripheral is busy processing the first set of peripheral requests from the first core, and when the peripheral has completed processing the first set of peripheral requests from the first core, the second interface is further configured to enter a busy state of the second state machine during which the peripheral processes the second set of peripheral requests from the second core.

12. The system of claim 11, wherein the first and second set of peripheral results are consistent with the peripheral simultaneously being a dedicated peripheral for both the first and second cores.

13. The system of claim 11, wherein the first core includes a subsystem selected from the group consisting of a digital signal processor and a central processing unit.

14. The system of claim 11, wherein the peripheral includes a subsystem selected from the group consisting of a floating-point calculation subsystem, an encryption/decryption engine, a graphics engine, an image processing engine, and a video processing engine.

15. The system of claim 11, further including:
a shared peripheral bus coupled to the queued interface device; and
a bus arbiter coupled to the shared peripheral bus and the first and second cores, the bus arbiter configured to selectively allow requests from the first and second cores to be communicated over the shared peripheral bus.

16. The system of claim 11, wherein the queued interface device is configured to enter a first busy state of a third state machine when the peripheral is processing the first set of peripheral requests, and is configured to enter a second busy state of the third state machine when the peripheral is processing the second set of peripheral requests.

17. The system of claim 11, wherein the first core has an associated first core ID, the second core has an associated second core ID, and the arbitrator is configured to selectively send the first set of peripheral requests and the second set of peripheral requests to the peripheral based on receipt of one of the first core ID or the second core ID.

18. A multi-core peripheral system comprising:
a first core;
a second core;
a peripheral; and
a queued interface device configured to communicate with the peripheral, the queued interface device comprising a first interface configured to receive and store a first set of peripheral requests from the first core, a second interface configured to receive and store a second set of peripheral requests from the second core, and an arbitrator coupled to the first interface and the second interface, the arbitrator configured to selectively send the first set of peripheral requests and the second set of peripheral requests to the peripheral and to receive respective first set of peripheral results and second set of peripheral results, wherein the first interface includes a first state machine, the second interface includes a second state machine, and the peripheral includes a third state machine, wherein each of the first and second state machines have the same topology as the third state machine, but further comprise a respective pending state.

19. A method of sharing a peripheral in a multi-core system, the method comprising:

receiving a first set of peripheral requests from a first core;

in response to receiving the first set of peripheral requests, entering a first busy state of a first state machine;

receiving a second set of peripheral requests from a second core;

in response to receiving the second set of peripheral requests, entering a pending state of a second state machine while the peripheral is busy processing the first set of peripheral requests, and entering a busy state of the second state machine when the peripheral has completed processing the first set of peripheral requests;

selectively sending the first set of peripheral requests and the second set of peripheral requests to the peripheral;

receiving a first set of peripheral responses from the peripheral;

receiving a second set of peripheral responses from the peripheral; and sending the first set of peripheral responses to the first core and the second set of peripheral responses to the second core.

20. The method of claim 19, wherein, during the sending step, the peripheral simultaneously appears to be a dedicated peripheral for both the first and second cores.

21. The method of claim 19, further including receiving the first set of peripheral requests and the second set of peripheral requests via a shared peripheral bus.

22. The method of claim 19, further including receiving the first set of peripheral requests via a first dedicated bus, and receiving the second set of peripheral requests via a second dedicated bus.

* * * * *